United States Patent Office 3,066,727
Patented Dec. 4, 1962

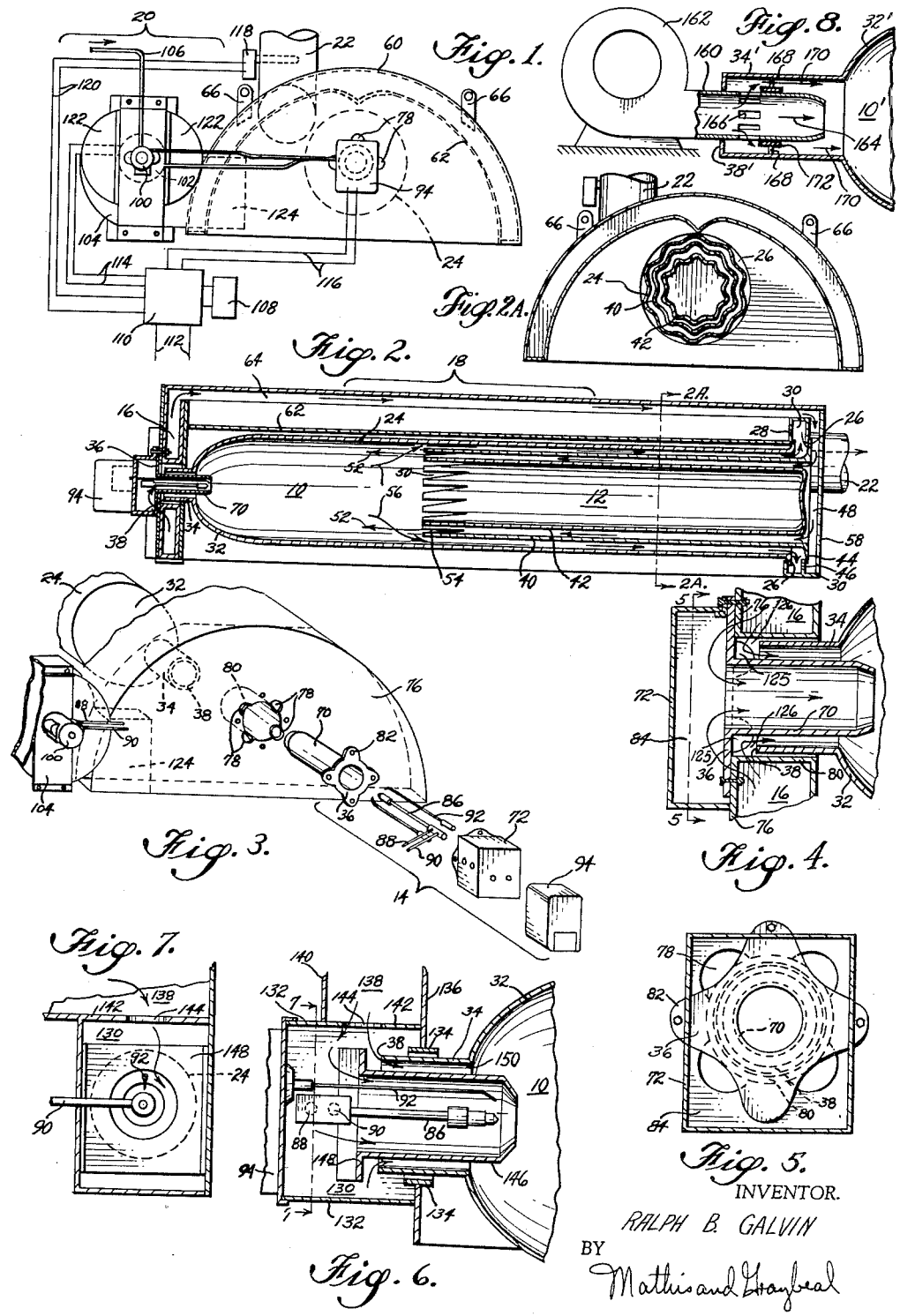

3,066,727
FURNACE INVOLVING TEMPERATURE RESPONSIVE COMPENSATION OF COMBUSTION AIR
Ralph B. Galvin, 614 S. Dunton Ave.,
Arlington Heights, Ill.
Filed June 9, 1959, Ser. No. 819,107
15 Claims. (Cl. 158—4)

The present invention and discovery relates to fuel-fired heating apparatus and more particularly relates to combustion air control methods and mechanisms wherein the relative amount of combustion air deemed optimum during start-up, warm-up and operating conditions is automatically maintained and controlled responsive to the temperature of the apparatus, specifically responsive to thermally induced change in dimension of a portion of the apparatus structure.

This application is a continuation-in-part of my co-pending U.S. Patent No. 2,946,510, issued July 26, 1960, and entitled High Temperature Conduit Radiant Overhead Heating, and also a continuation-in-part of my copending application Serial No. 811,147, filed May 5, 1959, entitled Heating Apparatus, said latter application being a divisional application of said former application, the said application Serial No. 811,147 being now abandoned in favor of a continuation application Serial No. 119,901, filed June 27, 1961.

Generally, the present invention and discovery relates to control of combustion air, commonly called burner air, by thermally induced change in dimension of combustion chamber structure in a fuel-fired heating apparatus, such as a furnace, a forced flow gaseous medium heater, or the like, and it is characterized by its particularly advantageous suitability and efficiency for such heating apparatus as is designed for so-called on-off operation, and especially with such heating apparatus as incorporate combustion air preheaters.

By virtue of the novel combination and arrangement of elements in a heating apparatus such as a furnace or the like, the thermal expansion of the combustion chamber is selected as a measure of flame temperature, and suitably dimensioned and oriented with respect to the flow path of combustion air to control the latter in a manner providing automatic compensation of the fuel-air mixture at the burner means of the apparatus, thereby maintaining such fuel-air mixture at an optimum regardless of the temperature condition of the apparatus, i.e. whether during start-up with the apparatus cold, during the temperature gradients encountered during warm-up, and during operating conditions with the apparatus at its highest operating temperature.

As will be apparent from the following consideration of various typical forms of the invention, the underlying concept thereof is the achievement of automatic thermo-responsive regulation of the volume and velocity of combustion air delivered to the combustion chamber of a fuel-fired heating apparatus, whether or not such apparatus employs air-preheater means, the novel combination and arrangement of the invention being such that the thermally induced expansion of the apparatus shell serves to decrease the secondary air flow through by-pass openings as the furnace shell heats up. In one embodiment of the concept (FIG. 4, discussed below), a cylindrical extension of the furnace shell longitudinally extends on heating to substantially abut a burner plate to reduce the flow of secondary auxiliary air and thus reduce the total combustion air delivered to the burner of the furnace. In another form of the invention (FIG. 6, discsused below), the arrangement is such that both primary and secondary air pass through a common burner box. In a third form of the invention (FIG.8, discussed below), the arrangement involves both primary and secondary air entering the base of the burner tube from a blower, with secondary air being led through lateral openings in the burner tube, which openings are throttled by a closing member such as a sleeve attached to the sleeve extension of the expanding end of the combustion chamber wall of the furnace. In the three such typical forms of the invention, the increase in combustion chamber temperature decreases the total volume of combustion air delivered to the flame while the velocity of the primary air is increased, which relationship increases the efficiency of combustion both on initiation of combustion and at such higher or operating temperatures as are generated progressively in the furnace during warm-up and during extended operation thereof. The relative greater total combustion air volume and relatively lower primary air velocity under starting or cold conditions of operation aid in establishing ignition and function to render the initial flame more stable and less susceptible to sooting.

By such temperature responsive compensation of combustion air, ideal flame conditions are maintained not only during operating condition with the heating apparatus hot, but also during start-up, with gradual and atomatic proportionate compensation during warm-up. Further, such arrangement makes practical the equipment of small on-off type fuel fired furnaces with combustion air preheaters, it being one common difficulty with such small on-off type furnaces that prior art combustion air control means are not suitable for use therewith.

Manual controls for fixed adjustment of combustion air, manually adjusted at the time of installation or servicing of the apparatus, are conventionally used on small on-off furnaces not equipped with air preheaters. Such pre-set, manual controls necessarily involve some degree of compromise between the amount of air most optimum for start-up and the amount of air most optimum for high temperature operation. In such furnaces, not equipped with air preheaters, the combustion air is of course not preheated but enters the fuel feeder and is mixed with the fuel at substantially room temperature during both cold start-up and hot combustion chamber conditions of operation.

The flame chemistry and stability of the flame are affected by the flame temperature and propagation rate, by the stream velocities of the mixing air and fuel, by the respective proportions of air and fuel, and by the distribution patterns caused by the mixing.

During start-up, the combustion air and the furnace walls are cold, so that flame temperature and propagation rates are low and fuel vaporization is poor. Under this cold starting condition, the velocity of the air near the fuel injector and ignitor must be low to establish ignition and prevent blow-off, with resultant ignition failure or noisy operation. Also, the quantity of combustion air must be increased during start-up to overcome smoking or sooting.

During high temperature operation, upon completion of the warm-up period, the combustion air and furnace walls are hot, so that flame temperature and propagation rate are high, and fuel vaporization is good. Under this hot operating condition the velocity of the air near the fuel injector must be high to prevent flame contact with the fuel injector, otherwise carbon formations, pulsation, and noisy operation result from alternating carbonic and hydroxylative combustion. Also, the quantity of combustion air must be reduced, within the no-smoke range, to derive maximum thermal efficiency.

Variations in flame propagation between starting and operating conditions are accentuated when air preheating is used. Expensive, complex and bulky automatic control apparatus used on large furnaces employing preheaters are not economically practical for small furnaces, particularly where cyclically or repetitively operated full-on and full-off. These prior art controls are used on large installations for proportioning flows through fuel valves and air dampers actuated from load measurement to accommodate system load swings. Some industrial furnace applications such as kilns and melting furnaces operate at a fixed fuel rate, and control the combustion air flow from flue gas analysis and combustion efficiency measurement. Large furnaces employing air preheaters are usually manually ignited and manually controlled during warm-up.

Basically the requirements of more air at lower velocity during cold start-up, and less air at higher velocity during high temperature operation, hold for all combustion type furnaces regardless of the type of fuel used (liquid, gas or solid) and for any method of admitting air into the furnace combustion chamber.

The various objects, features and advantages of the present invention, as above mentioned, as well as various other features, advantages and objects thereof will be apparent from the following description of certain typical and therefore non-limitive embodiments thereof, together with the accompanying figures of illustration, wherein like reference numerals indicate like parts, and wherein:

FIG. 1 is a view in end elevation of a space heater furnace and insulating hood, taken from the burner end of the furnace;

FIG. 2 is a view in longitudinal vertical cross section through the furnace shown in FIG. 1;

FIG. 2A is a view in transverse cross section through the preheater section of the furnace shown in FIGS. 1 and 2 taken substantially along line 2A—2A of FIG. 2;

FIG. 3 is an exploded perspective view showing the burner and air chest details of the furnace of FIGS. 1 and 2;

FIG. 4 is an enlarged view in longitudinal vertical section of the combustion air chest and related combustion air flow path components of the furnace of FIGS. 1 and 2, with the burner nozzle, electrodes and ignition transformer removed;

FIG. 5 is a view in end elevation, partly in section, taken substantially along line 5—5 of FIG. 4;

FIG. 6 is a view in longitudinal vertical section of a modified arrangement of burner, combustion air chest and combustion air flow path forming components;

FIG. 7 is a view in end elevation, partly in section, taken substantially on line 7—7 of FIG. 6; and FIG. 8 is a fragmentary side elevational view, on a reduced scale with several parts broken away, showing yet another form of combustion air control characteristic of the invention, the air control being effected through action of sleeve-like valving closing off porting in a blower connected burner tube.

FIGS. 1–5 show a furnace equipped with an air preheater, similar to that described and claimed in my aforementioned copending Patent 2,946,510 and application Serial No. 811,147, and also incorporating furnace shell structure and combustion air flow path forming components according to the present invention. As will be readily apparent, this type of furnace is typical of a heating apparatus in which the principles of the present invention can be utilized, such form of space heater being selected merely by way of example for purposes of illustration of the invention. As will also be apparent, this and similar heating apparatus is suitable for a wide variety of heating applications for both space heating and industrial processing, for example.

Such form of furnace typifies the small type of furnace equipped with an air preheater, for which the control of the combustion air by means of the elemental arrangements and techniques described herein are particularly adapted. It is to be expressly understood, however, that the mechanisms and techniques of controlled combustion air, according to the present invention and discovery, are not limited to this particular type of heating apparatus either as to size or type, or as to preheater arrangement or type of fuel, or use to which the apparatus is put.

Referring more specifically to the furnace illustrated in FIGS. 1–5, such in general comprises a combustion zone, section or chamber indicated at 10 (FIG. 2), a preheater section indicated at 12 (FIG. 2), a fuel and primary air injector assembly 14 (FIG. 3), a combustion air delivery chest 16 (FIGS. 2 and 4), a substantially semi-cylindrical hood 18 (FIG. 2), fuel and air delivery means and associated control components, indicated generally at 20 (FIG. 1), and an exhaust stack 22 (FIGS. 1 and 2).

Combustion section 10 and preheater section 12 are enclosed by an outer wall 24, which can also be termed a shell, of substantially cylindrical form, flanged as at 26 and fixedly attached by said flange 26 to a wall 28 of exhaust chest 30. The end of combustion chamber wall 24 remote from the fixed mounting provided by flange 26 is sloped convergingly, as indicated at 32, and terminates in an air control sleeve 34, which is also termable a secondary combustion air channelling sleeve. As will be developed more fully hereinafter, it is the throttling action of air control sleeve 34, with the change in position thereof longitudinally of the apparatus being responsive to thermally induced changes in dimension of combustion chamber wall 24, which provides the automatic combustion air compensation characteristic of the present invention. Said air control sleeve 34 faces injector plate 36 and the cross-sectional area of the gap therebetween constitutes a throttled combustion air flow passageway, the relative position of these parts as shown in FIG. 4 representing their spacing under cold, i.e. start-up, condition, the dimensional considerations being such that the outer edge 38 of said air control sleeve 34 substantially abuts said injector plate 36 when the furnace has reached normal, i.e. full load, operating temperature.

As disclosed in the aforesaid copending patent and application, the preheater section 12 of the furnace comprises a middle shell 40 and an inner shell 42, said middle shell 40 being flanged as at 44 and attached to wall 46 of exhaust chest 30, the arrangement being such that incoming air from preheater chest 48 passes between said inner shell 42 and said middle shell 40, emerging into combustion section 10 in segmented jets emerging through nozzles 54 formed between openings 50 at the ends of shells 40 and 42, such jets being diagrammatically indicated at 52, while the combustion gases exhausting from combustion section 10 are withdrawn through openings 50 and pass between said middle shell 40 and wall 24, thence through exhaust chest 30 out stack 22, the direction of flow of such exhaust gases from combustion section 10 being indicated by arrows 56.

By this arrangement, incoming air passing between inner shell 42 and middle shell 40 is in counterflow heat exchange relationship with the exhausting combustion gases passing between wall 24 and middle shell 40. End plate 58 completes the end assembly forming preheater air chest 48.

The hood of the furnace, generally indicated at 18, comprises an outer metal cover sheet 60, and an inner reflector sheet 62, preferably with insulation (not shown) therebetween except for a combustion air passageway 64 along the top of hood 18 between said outer cover sheet 60 and said reflector sheet 62. Said combustion air passageway 64 communicates incoming combustion air chest 16 with combustion air chest 48. The hood 18 portion of the apparatus further comprises a plurality of straps 66 for mounting the unit above the space to be heated. Typically, the reflector sheet 62 can be made in two parts with an overlapping, free-sliding joint, or can be provided with edge clearance to permit its free thermal expansion in relation to cover sheet 60.

The burner assembly 14, which may also be termed an injector assembly, comprises a burner tube 70, which may also be termed an air injector tube, situated concentrically and interiorly of air control sleeve 34, said tube being integrally mounted on injector plate 36. Injector plate 36, along with injector box 72, is attached as by bolts to the outer wall 76 of combustion air delivery chest 16, the design being such as to leave apertures or passageways 78 through a part of outer wall 76 and the cylindrical inner wall or sleeve 80 of said chest 16, which passageways 78 are situated between the eyes 82 of said injector plate 36 so that incoming combustion air can flow from chest 16 into burner box space 84, thence through burner tube 70. The incoming combustion air thus delivered through air injector tube 70 is the primary combustion air for the flame, as will be readily recognized by those skilled in the art.

The fuel injection assembly or fuel injector 86 has leading thereto the fuel and atomizing air lines 88 and 90, with ignition electrodes 92 and ignition transformer 94 completing the burner assembly 14.

The fuel and air delivery means and associated control components, indicated generally at 20, will be recognized as a typical control arrangement, conventional per se, for on-off regulation of a fuel fired heater. Thus, fuel and atomizing air are delivered to lines 88 and 90 from fuel pump 100. Ignition voltage is supplied to the ignition electrodes 92 by transformer 94. Fuel unit motor 102 drives combustion air blower 104 and fuel pump 100. Fuel is supplied from a suitable source of supply, as through tube 106. On-off control regulation is provided by relay or thermostat 108 through controller 110 which connects line voltage 112 to motor lines 114 and transformer lines 116. Stack switch 118 is connected to controller 110 through lines 120 to provide for safety shut-down in the event of flame failure.

Incoming combustion air enters blower 104 through adjustable inlet dampers 122, thence through blower discharge 124 into combustion air chest 16. As previously indicated, some of the combustion air passes from combustion chest 16 through combustion air passageway 64 into preheater air chest 48, and another portion of the incoming combustion air passes from chest 16 through apertures 78 into the space 84 in injector box 72, then into the combustion section interiorly through air injector tube 70, becoming primary combustion air. A third portion of the incoming combustion air from chest 16 flows through by-pass apertures 125 (see FIG. 4) leading from said chest 16 into the space 126 between injector plate 36 and end 38 of air control sleeve 34, the latter thereby constituting a throttling means for this portion of the combustion air. This air emerges into the combustion section exteriorly of injector tube 70 and represents secondary combustion air. As will be noted, it is this latter portion of the incoming combustion air which is throttled upon substantial abutment of end 38 of air control sleeve 34 against injector plate 36 when the thermal expansion of wall 24 occurs, i.e. when the combustion section 10 and preheater section 12 reach normal operating temperature. Conversely, under a cold condition of operation, such as during start-up, substantial secondary air is delivered through said by-pass apertures 125.

As will be noted, with the amount of incoming combustion air delivered by blower 104 substantially constant for all conditions, there occurs an increased total volume of air and an accompanying reduction in air velocity of primary combustion air delivered to the combustion flame from the burner end of the combustion section when the apparatus is cold, and there is a corresponding relative reduction in volume of total combustion air and relative increase in velocity of primary air when by-pass apertures 125 are substantially closed off by air control sleeve 34 on occasion of combustion chamber wall 24 reaching normal operating temperature. In this respect, and to dimensionally show one typical form of the invention, an existing installation has a wall 24 of 22 gauge rolled steel, measuring 68¾ inches from flange 26 to end 38 of sleeve 34, an inside diameter of 11 inches in combustion chamber 10, and an inside diameter at sleeve 34 of about 3⅞ inches. In this installation the gap between end 38 of sleeve 34 and burner plate 36 at cold condition (70° F.) is about ⅝ inch, and the gap is closed by abutment of end 38 against plate 36 when the furnace reaches its full load operating temperature of about 1400° F. in chamber 10.

FIGS. 6 and 7 serve to illustrate a modified form of combustion air flow control. In this instance, the combustion section outer shell, including curved portion 32, control sleeve 34 and control sleeve edge 38 can be constructed and mounted as before. Air control sleeve 34 is free to expand into the interspace 130 of injector box 132, sliding on bearing 134 in wall 136, which also serves as the inner wall of combustion air delivery chest 138, along with outer wall 140 and wall 142 of injector box 132. Wall 142 is provided with a relatively restricted passageway 144, the arrangement providing that all incoming air to the burner assembly is delivered through the interspace 130 of injector box 132, thence either interiorly of injector tube 146 as primary air or between injector plate 148 and end 38 of air control sleeve 34, passing through space 150 into combustion section 10 as secondary air for the flame generated by fuel injector unit 86, the assembly as shown further including fuel and atomizing air supply lines 88 and 90 as well as ignition electrode 92. Transformer 94 is also shown fragmentarily.

As shown in FIG. 7, injector plate 148 is fixed in relation to injector box 132. Combustion air from the combustion air delivery chest 138 enters the injector box space 130 through passageway 144, which is comparatively restricted in area as compared with the flow path area in chest 138 and the total flow path areas in and from injector box 132. A portion of the combustion air in space 130 of injector box 132 passes into the injector tube 146. Another portion passes between injector plate 148 and the edge 38 of air control sleeve 34, which latter portion of the air is that which is throttled responsive to thermal change in dimension of combustion chamber wall 24 of the apparatus.

As will be noted, the modified form of the invention shown in FIGS. 6 and 7 varies from that shown in FIGS. 1–5 to the extent that, in the instance of the embodiment shown in FIGS. 6 and 7, all of the incoming combustion air passes through a relatively restricted orifice 144 into the injector box interspace 130, thence through either injector tube 146 or space 150. Comparatively, in the arrangement first discussed, as shown at FIG. 4, for example, that portion of the incoming air which passes into interspace 84 of injector box 72 becomes primary air passing through injector tube 70, while the secondary air passes directly from air delivery chest 16 through apertures 125 into the interspace 126 surrounding injector tube 70. In other words, the combustion air control action effected by air control sleeve 34 in the arrangement shown in FIG. 4 utilized the constant capacity of blower 104 to effect the air velocity change occurring on throttling of the secondary air flow, while the arrangement shown in FIGS. 6 and 7 is in a sense more responsive and sensitive in terms of velocity change characteristics because of the pressure drop occurring through relatively restricted orifice 144. In either arrangement, a minimal amount of secondary air can be supplied around the injector tube at the operating temperature, when so desired, by suitable porting in either control sleeve 34 or flange 36 of FIG. 4 or the flange 148 of FIG. 6.

From an inspection of FIGS. 4 and 6, for example, it will be seen that considered compositely the fuel and combustion air injector assembly comprises the fuel injector 86, the so-called burner tube or injector tube 70 or 146 (for primary air), and the air control sleeve 34 (providing a secondary air passageway with tube 70 or 146).

FIG. 8 presents a fragmentary side elevational view, partially broken away cross sectionally, of yet another typical form of the invention, wherein both primary and secondary air enter the injector tube and the secondary air is led through lateral openings in the injector tube throttled by a closing member such as a sleeve attached to the sleeve extension of the expanding end of the combustion chamber wall. For clarity of illustration, the fuel injector and associated components are omitted from the view of FIG. 8. In the form of apparatus shown in FIG. 8, the combustion chamber 10' is defined by a wall having the sloping end wall 32' extending into sleeve element 34', which is in turn inwardly lipped at the free end thereof 38' so as to closely fit around injector tube 160. In this form of the invention, incoming combustion air is delivered under pressure directly into injector tube 160 from blower 162. As in the previous forms of the invention discussed, the air pressure and velocity of the incoming air delivered to said injector tube 160 are functionally related to the pressure-capacity characteristics of said blower 162.

In the arrangement shown in FIG. 8, primary air passes directly through injector tube 160, as indicated at 164. Secondary air passes through a series of annularly arranged, longitudinally extending slots or ports 166 in injector tube 160, thence past a series of spaced mounting posts 168 into the combustion chamber 10', as designated by arrow 170. Situated on a series of spaced, circumferentially arranged mounting posts 168 on sleeve 34' is an annular throttling sleeve 172 of substantial width in closely spaced, surrounding relation with respect to injector tube 160. The relative relation of throttling sleeve 172 and ports 166 illustrated in FIG. 8 is that relative position occurring when the apparatus is cold, i.e. at start-up. Operationally, as the combustion chamber and chamber wall heat, sleeve element 172 will progressively close off ports 166, thus reducing the volume of secondary air, reducing the total air and increasing the velocity of the primary air with a given blower 162 capacity.

The shape of the lateral ports 166 or the closing member 172 can of course be varied to obtain any desired rate of change in the secondary air reduction rate with increasing furnace wall temperature, to match the particular flame characteristics of any given heating apparatus.

As will be evident from a comparison of the constructional arrangement shown in FIG. 8 with the arrangements shown in the earlier discussed form of the invention, it is not necessarily characteristic of the invention to have a planar injector plate as part of the variable area bypass passageway. Rather, the important consideration is that the secondary air portion of the combustion air be throttled proportionately inversely to the relative temperature of the combustion chamber, responsive to change in dimension of the combustion chamber wall. Accordingly, this characteristic manner of operation can be realized by many and various elemental arrangements, constructionally considered.

To further illustrate the nature, features and advantages of the invention, the manner of operation of the furnace illustrated in FIGS. 1-5 and its air control will be discussed from an operational aspect. Assuming furnace wall 24 and preheater shells 40 and 42 are relatively cold, upon demand of thermostat 108 for heat, controller 110 operates to energize transformer 94 and to start motor 102 and supply combustion air through blower 104 and fuel through pump 100 to the furnace fuel injector 14. With the equipment in such relatively cold condition, the by-pass air ports 125 in sleeve 80 are uncovered, and the flow of air through said by-pass ports 125 into the annular space 126 around the injector tube 70 provides additional air for start-up combustion. This comparatively large volume of air flow during the start-up and warm-up periods reduces the discharge pressure from blower 104 and causes an increase in the combustion chamber 10 pressure, resulting in a decrease in the air flow and velocity of air flow inside the injector tube 70. Ignition takes place in a lower velocity stream of incoming cold combustion air, and the excess air surrounding the outside of injector tube 70 prevents smoking while the fuel vaporization is poor in the cold or relatively cold combustion chamber 10 and while cold air is coming through the preheater section 12. At the outgoing flue or exhaust gases warm the incoming preheater air, and the flame temperature becomes hotter, the wall 24 heats up and expands, and air control sleeve 34 gradually reduces the effective area of space 126 and eventually substantially closes off by-pass ports 125. This decreases the volume of air flow into combustion chamber 10, and the discharge pressure from blower 104 increases, causing an increase in air flow velocity through injector tube 70 and through the preheater section 12. Fan inlet dampers 122 are optimally adjusted for maximum practical efficiency at the high temperature, full load operating condition of the furnace. The decrease in the total amount of combustion air by the closing of by-pass ports 125 reduces the amount of excess air, increases the flame temperature, and the heat transfer rate with a resultant improved efficiency. The increase in airflow through the injector tube 70 holds the flame away from the fuel injector 86 and the increase in velocity of the air flow through the injector tube 70 also provides improved mixing of the primary air with the fuel spray emerging from fuel injector 86, minimizing any tendency for the flame to smoke.

The operation of the furnace combustion air control, in the form of the invention illustrated at FIGS. 6 and 7, is as follows: All or only a portion of the combustion air may enter into the furnace through injector box 132. In any event, as the furnace warms up causing its combustion chamber wall 24 to expand in relation to injector plate 148, the opening between said plate 148 and end 38 of air control sleeve 34 progressively diminishes, causing a reduction in the total air flow into combustion chamber 10. Said passageway 144 acts as a metering orifice to limit the total flow of air into the injector box 132 so that the pressure in box 132 and hence the velocity in tube 146 is reduced at start-up when a portion of the air by-passes injector tube 146 through the opening between plate 148 and end 38 of sleeve 34. Said passageway 144 need not be restricted if the combustion air blower which feeds chest 138 is operating with a sufficiently steep so-called drooping pressure-capacity curve characteristic.

Higher primary air velocities are required as the flame temperature increases because of the increased flame propagation rate resulting from the hot combustion chamber walls and resulting from the air preheating (if used), regardless of how the preheated air is admitted into the combustion chamber, e.g. through nozzles 52 and/or injector box 72.

Regardless of the degree, or proportionate distribution of the combustion air through a preheater, or the flow pattern used to feed air into the furnace combustion chamber, best operating results are obtained when the burner air velocity in proximity with the fuel injector 86 (i.e. primary air) is increased to maintain the proper relationship with the increasing flame propagation rate during the warm-up period and during full-load operating conditions. Likewise, best operating results are obtained when the total quantity of combustion air entering the combustion chamber of a furnace is reduced during warm-up to maintain maximum efficiency consistent with minimum smoke. As will be apparent, the automatic air flow control provided by the present invention functions to automatically and simultaneously accomplish both modes of adjustment, i.e. progressive reduction in total air and progressive increase in air velocity as the furnace temperature progresses from the cold condition to its rated operating temperature condition.

The thermal expansion of the combustion chamber structure in a fuel fired furnace can be used to regulate the flow of any proportion of the total combustion air by means of by-pass control of air around the vicinity of fuel injection and ignition (as in FIG. 4), or by means of a relatively restricted orifice and balancing of the velocity and pressure changes as between both primary and secondary air in a common chamber, such as injector box interspace 130 in FIGS. 6 and 7, or through temperature related modulation of the volume of secondary air and/or velocity of the primary air in any other suitable manner.

Furthermore, the control or regulation of the by-pass air passage area or opening can be varied in a straight line relationship with the thermal expansion measurement or dimension of the furnace, or in any desired form as determined by orifice shapes, linkage devices, or damper means used to match the cold-start and normal-operating requirements of any particular burner. Likewise, as indicated, velocity control in the vicinity of the fuel injection and ignition may be simply based on the pressure-capacity performance characteristics of the combustion air delivery flow (as in FIG. 4), or a flow limiting device such as an orifice restricter in the total burner air flow line (as at 144 in FIG. 6), to provide reduced pressure and velocity of flow at the increased total air to the burner which is desired during cold start-up.

As will be evident to those skilled in the art, the present invention and discovery involves a furnace air control arrangement which is simple, positive and automatic in operation, and combines the need for excess air on start-up with the need for increased velocity at normal operating temperature, all in a manner providing automatic, smooth and positive transition between these contrasting operating conditions. Reliable ignition on the one hand and efficient full load operation on the other hand has long involved a compromise of preset fuel-air ratios and gas velocities in the art of small furnace operation, and the present invention and discovery practically and efficiently obviates the necessity for compromising between the contrasting operating conditions.

As will be apparent from the foregoing discussion of the nature and features of certain typical embodiments of the present invention, the method of combustion air control and combustion air control arrangements characteristic of the invention are readily adaptable to a wide variety of heating apparatus, such as furnaces and air heaters, including furnaces ranging in size from large central station steam generators to small domestic heaters without air preheaters.

Typical of the large central station furnace is the suspended water wall furnace with provision for downward expansion of the combustion chamber structure during warm-up. This type of furnace employs extensive air preheater surfaces of either the shell and tube type, or plate, or regenerator design. Control of combustion air during warm-up could, in such a furnace, be by direct control of an air by-pass opening around the fuel feeder and air mixing ports, by expansion of the furnace structure into the injector box, in a manner similar to that shown in the accompanying drawings, or by control of dampers in appropriate combustion air passages through linkage means. The purpose of warm-up control of combustion air on this type of furnace would be to enable placing the furnace on the line automatically. The warm-up control would not replace the usual controls for load swings and combustion efficiency regulation, but would be superimposed on the controls and would function independently of them.

Likewise, the method of combustion and air by-pass control by thermal expansion of the combustion chamber wall structure can be used on furnaces without preheaters to permit closer adjustment of fuel-air ratios for maximum operating efficiency, without the usual limitations imposed by the starting air requirement.

From the foregoing, various further modifications, variations in elemental arrangements, and modes or techniques of constructing and operating heating apparatus and components thereof according to the spirit and principles of the present invention will occur to those skilled in the art, within the scope of the following claims.

What is claimed is:

1. A fuel-fired apparatus having a combustion chamber, a fuel injector directed into said combustion chamber at one end thereof, means delivering combustion air to said combustion chamber including flow path means for primary air delivering same into said combustion chamber in surrounding relation to said fuel injector, flow path means by which secondary combustion air is delivered into the said combustion chamber from the end thereof in which said fuel injector is situated so as to confluently surround the fuel and primary air prior to any substantial flame combustion thereof, a further flow path means for secondary air delivering same to said combustion chamber through a preheater section arranged in counterflow relation to the flow of products of combustion discharged from said combustion chamber, and throttle means situated proximately of said fuel injector, operating responsively to temperature changes in a wall of said combustion chamber to progressively restrict the amount of combustion air delivered as secondary air through the secondary air flow path means first above specified as said chamber wall is progressively heated.

2. Apparatus according to claim 1, wherein said primary air flow path means includes an injector tube surrounding said fuel injector, and said first mentioned secondary air flow path means is defined by a sleeve-like element in spaced, surrounding relation with respect to said injector tube, the said fuel injector, injector tube, sleeve-like element, and preheater section flow path means all being substantially coaxially disposed.

3. A fuel fired heating apparatus characterized by temperature responsive control of combustion air flow so as to maintain good flame combustion conditions during both start-up and during normal full-load operation, said heating apparatus comprising a combustion chamber defined by a chamber wall and having an injector assembly situated at one end of said combustion chamber and directing a stream of fuel and combustion air into said combustion chamber at the said one end thereof, said injector assembly comprising a variable area secondary combustion air delivery passageway including air flow throttling means, a part of said throttling means being structurally integrated with said chamber wall and thereby moved in relation to the temperature of said wall to reduce the effective area of said passageway as said wall becomes heated, the said secondary combustion air delivery passageway being situated to deliver the secondary combustion air into the chamber from the end thereof in which said injector assembly is situated so as to confluently surround said stream of fuel and combustion air prior to any substantial flame combustion thereof.

4. Apparatus according to claim 3, wherein said air flow throttling means is most open when said combustion chamber wall is cold and is substantially closed off by the expansion of said combustion chamber wall when said combustion chamber is at full-load operating temperature.

5. Apparatus according to claim 3, wherein said injector assembly comprises a fuel injector and an air injector tube coaxially surrounding said fuel injector in spaced relation thereto, the space between said fuel injector and said injector tube providing a flow path for primary combustion air and the exterior surface of said injector tube forming a portion of said secondary combustion air delivery passageway.

6. Apparatus according to claim 5, wherein said air flow throttling means comprises at least one lateral opening in said air injector tube, and the part of the throttling means structurally integrated with said combustion chamber wall is an air flow control sleeve disposed in surrounding, spaced relation with respect to said injector tube, the said sleeve coacting with said opening to regulate the amount of air delivered through said secondary combustion air delivery passageway.

7. Apparatus according to claim 5, wherein said air flow throttling means comprises a substantially planar plate integral with said injector tube and extending laterally of said fuel injector, and further comprises an air control sleeve integral with said combustion chamber wall at the end thereof adjacent to said air injector tube.

8. Fuel fired heating apparatus comprising a substantially cylindrical combustion chamber shell, an unignited fuel and primary air injector assembly situated at one end of said shell, means anchoring said combustion chamber shell at the end thereof remote from said injector assembly in fixed spacial relationship with said injector assembly, secondary combustion air flow path means providing a passageway around said injector assembly for secondary combustion air delivery into said combustion chamber, such flow path means comprising a structurally integrated extension of the end of said combustion chamber shell end immediately adjacent to said injector assembly, which extension coacts with an element stationary with respect to said injector assembly and also forming a portion of such secondary combustion air flow path means to effectively throttle the secondary combustion air flow and increase the velocity of the primary combustion air when said combustion chamber shell expands upon being heated by combustion in said combustion chamber, such primary air and secondary air flow path means being fed from a common air supply means.

9. A fuel fired apparatus having a combustion chamber defined by a wall of elongated generally cylindrical configuration, an unignited fuel and combustion air injector assembly directed axially into said combustion chamber at one end thereof, said combustion chamber wall being mounted in fixed position at the end thereof remote from said injector assembly and mounting at its end adjacent to said injector assembly an air controlling, sleeve-like element functioning as a part of said injector assembly, said apparatus further comprising means supplying combustion air to said injector assembly, including an air chest, blower means delivering air to said air chest, and an injector box in direct communication with said air chest and enclosing the end of said injector assembly remote from said combustion chamber, said injector assembly further including a throttle plate extending generally transversely of the axial dimension of said combustion chamber, the said throttle plate and said sleeve-like element being relatively spaced apart when said combustion chamber wall is cold, the space therebetween constituting a regulated flow passageway for a portion of the combustion air.

10. Apparatus according to claim 9, wherein said injector assembly further comprises a fuel injector and an injector tube extending in spaced relation coaxially thereof, the interior space of said injector tube being in direct communication with the interior space of said injector box, and the space between said throttle plate and said sleeve-like element being in direct communication with said air chest.

11. Apparatus according to claim 9, wherein said injector assembly further comprises an injector tube in surrounding relation to a fuel injector, the interior space of said injector tube and the regulated flow passageway between said throttle plate and said sleeve-like element being in direct communication with the interior space of said injector box, the aforesaid direct communication from said injector box to said air chest being through a passageway of relatively restricted area so that upon reduction of the total amount of air flowing between said throttle plate and said sleeve-like element, the relative pressure in the interior space of said injector box is relatively increased, causing a relative increase in velocity of primary combustion air through said injector tube.

12. Fuel fired heating apparatus comprising a substantially cylindrical combustion chamber shell, an injector assembly situated at one end of said shell and delivering a stream of unignited fuel and primary combustion air into the combustion chamber defined by said shell, means anchoring said combustion chamber shell at the end thereof remote from said injector assembly in fixed spacial relationship with said injector assembly, secondary combustion air flow path means providing a passageway around said injector assembly for delivery of secondary combustion air into said combustion chamber from the end thereof in which said injector assembly is situated, so as to confluently surround said stream of unignited fuel and primary combustion air prior to any substantial flame combustion thereof, such secondary combustion air flow path means comprising a structurally integrated extension of the end of said combustion chamber shell end immediately adjacent to said injector assembly, which extension coacts with an element stationary with respect to said injector assembly to effectively throttle the secondary combustion air flow when said combustion chamber shell expands upon being heated by combustion in said combustion chamber.

13. In a fuel fired heating apparatus; a combustion chamber; a fuel injector directed into said combustion chamber at one end thereof to deliver a fuel stream therein; an air injector tube immediately surrounding said fuel injector and directed into said combustion chamber to deliver and mix a primary combustion air stream with said fuel stream; a secondary combustion air channelling sleeve immediately surrounding said injector tube and providing therewith a flow passageway arranged to discharge secondary combustion air into said combustion chamber from the end thereof in which said fuel injector and air injector tube are situated so as to be in confluently surrounding contact with the mixed fuel and air stream before any substantial flame combustion thereof, the said sleeve being structurally integrated with the end of said combustion chamber surrounding said air injector tube; and secondary combustion air flow throttling means including said air channelling sleeve, by which the thermal expansion of said combustion chamber resulting from flame combustion therein reduces the volume of secondary combustion air delivered to said chamber.

14. Fuel fired heating apparatus comprising a combustion chamber with a sleeve extension surrounding an injector assembly situated at one end of said combustion chamber and directing a stream of fuel and primary combustion air into said combustion chamber, the external surface of said injector assembly and the internal surface of said sleeve extension constituting a flow path means by which secondary combustion air is delivered into the said combustion chamber from the end thereof in which the injector assembly is situated so as to confluently surround said fuel and air stream prior to any substantial flame combustion thereof, the said sleeve extension forming a part of a throttling means for the said flow path means responsive to thermally induced changes in dimension of said combustion chamber for increasing the volume of secondary combustion air delivered through said sleeve extension into the combustion chamber when the temperature thereof is low and for decreasing the volume of secondary combustion air delivered through said flow path means when the temperature of said combustion chamber is raised by the flame combustion therein.

15. Fuel fired heating apparatus having a walled combustion chamber and injector assembly including a fuel injector and a primary air injector tube situated at one end of said combustion chamber which mixes and directs a fuel and primary air stream into said combustion chamber from the said one end thereof, secondary combustion air delivery means situated to discharge into said combustion chamber from the said one end thereof and through a passageway along the outside surface of said injector tube, and secondary combustion air throttling means in said flow passageway, the said throttling means comprising relatively opposed surfaces, one such surface being structurally integrated with said injector tube and the other such surface being structurally integrated with said combustion chamber wall and arranged to immediately surround said injector tube, the secondary combustion air passageway defined by the outside surface of said injector tube and the said surface immediately around such tube serving to direct secondary combustion air into confluently surrounding contact with the aforesaid fuel and air stream before any substantial flame combustion thereof, said throttling means being controlled by thermal expansion of the combustion chamber wall so as to be relatively open when said wall is cold and so as to be relatively closed when said wall is heated.

References Cited in the file of this patent

UNITED STATES PATENTS

| | | |
|---|---|---|
| 2,621,477 | Powter et al. | Dec. 16, 1952 |
| 2,837,893 | Schirmer | June 10, 1958 |
| 2,927,632 | Fraser | Mar. 8, 1960 |

FOREIGN PATENTS

| | | |
|---|---|---|
| 1,148,255 | France | June 17, 1957 |
| 666,944 | Great Britain | Feb. 20, 1952 |